Dec. 16, 1958  L. F. R. FELL  2,864,265
POWER UNITS
Filed Nov. 1, 1954  5 Sheets-Sheet 2

INVENTOR
LOUIS F. R. FELL
BY

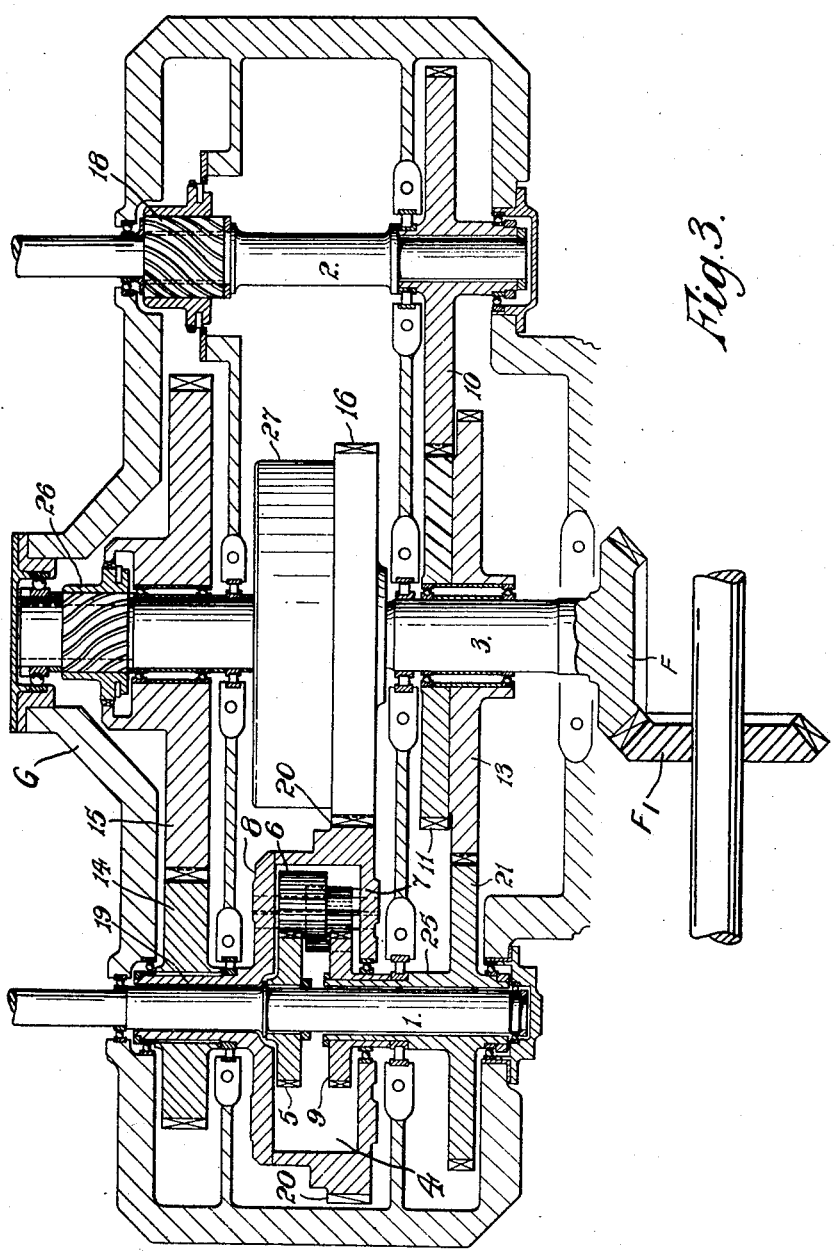

Dec. 16, 1958  L. F. R. FELL  2,864,265
POWER UNITS
Filed Nov. 1, 1954  5 Sheets-Sheet 4
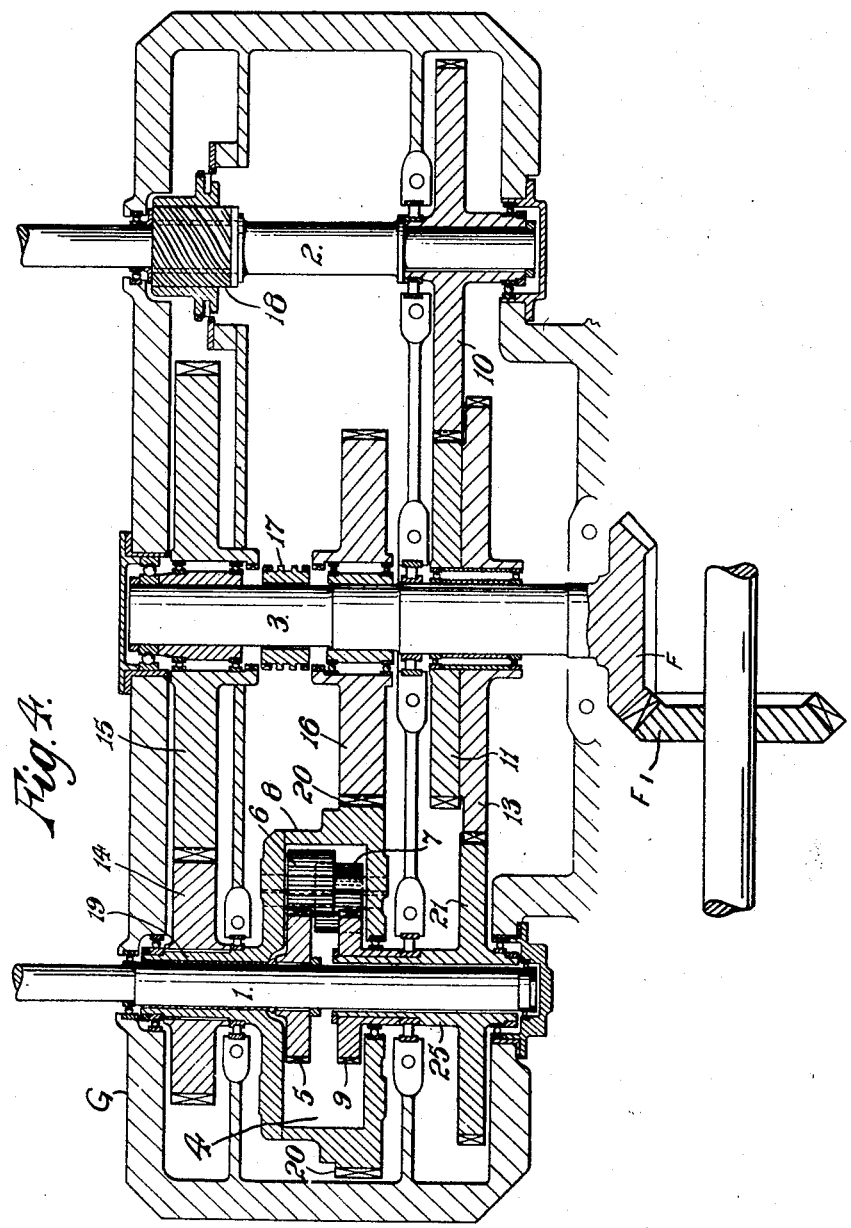
INVENTION
Louis F. R. FELL

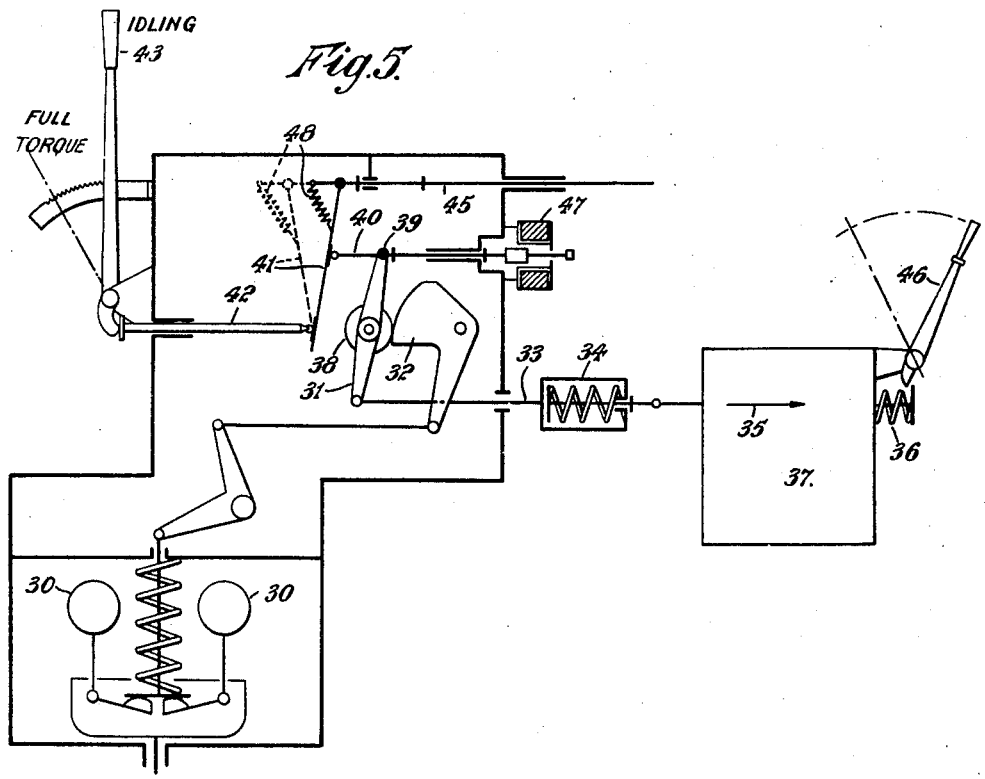

United States Patent Office 2,864,265
Patented Dec. 16, 1958

2,864,265

POWER UNITS

Louis F. R. Fell, Littleover, England, assignor to Fell Developments Limited, London, England, a British company Application November 1, 1954, Serial No. 466,145

Claims priority, application Great Britain November 13, 1953

10 Claims. (Cl. 74—675)

This invention relates to a power unit which is suitable for driving a mechanism of the kind requiring a driving torque which is at a maximum when starting the mechanism from rest and falls steadily as the speed of the mechanism increases. Examples of this kind of mechanism are self-propelled vehicles for example railway locomotives, and the power unit of the present invention can be used with special advantage for driving such locomotives.

Prime movers are known having an output torque/speed characteristic such that the output torque is zero when the prime mover is at rest, rises to a maximum at the minimum operating speed of the prime mover and thereafter falls steadily as the speed of the prime mover increases. An example of such a prime mover is a compression-ignition internal combustion engine which is supercharged at a pressure which is at its maximum when the engine is at its minimum operating speed, the engine being provided with a governor controlling its fuel injection to give the torque/speed characteristic described. U. S. patent specification No. 2,589,788 describes a power unit in which two such engines are connected with the sun wheels of a differential gear through variable filling fluid couplings, the planet carrier of the gear being used to drive a driven mechanism of the kind described, and each sun wheel being associated with a unidirectional device which permits rotation thereof in one direction but not the other. The said specification also describes a power plant comprising two such power units, the planet carrier of each unit being arranged to drive a sun wheel of a further differential gear, the planet carrier of which drives the driven mechanism.

In order to improve the low-speed torque of such a power unit, it has previously been proposed to interpose torque multiplying means between each prime mover and the associated sun wheels of the differential gear connecting two prime movers. Thus in U. S. patent application No. 207,899 now Patent No. 2,779,213, there is described a power unit, in which the interposed torque multiplying means are epicyclic or differential gears each giving two speed ratios between the driving element, i. e. the prime mover, and the driven element, i. e. the associated sun wheel, these ratios being approximately 2:1 and 1:1.

It has now been found that a power unit of the type referred to in U. S. patent application No. 207,899 can be more easily constructed if the torque multiplying means are provided between the planet carrier of the differential gear connecting the prime movers and the final drive to the mechanism to be driven by the power unit, instead of between the prime movers and the sun wheels of this differential gear.

It is therefore an object of the present invention to provide, in a power unit of the type described in U. S. patent specification No. 2,589,788, a variable speed gear between the planet carrier of the differential gear and the final drive to the mechanism to be driven by the power unit.

A further object of the present invention is the provision in such a power unit of a variable speed gear of the constant mesh type which includes one or more unidirectional devices and one or more yielding clutches (i. e. electromagnetic, variable filling fluid or friction clutches) to connect the operative gear or gear train to the final drive so that gear change may be made with little or no interruption in the output torque.

In low speed locomotives such as those intended for shunting, gear changing is almost invariably accomplished when the locomotive is stationary and, in such a case, it is a still further object of the present invention to omit at least one of the unidirectional devices and at least one of the frictional clutches just referred to and to replace them by simple dog clutches to connect the operative gear to the final drive as indicated in more detail below.

Another object of the present invention is the provision of means for driving the planet carrier of the differential gear at different torque ratios by the respective prime movers.

It will be appreciated that a power unit in accordance with the present invention may comprise more than one pair of prime movers as indicated in U. S. patent specification No. 2,589,788 and, in such a case, the variable speed gear is preferably connected directly to the final drive, i. e. is situated between the third differential of Figure 1 of U. S. patent specification No. 2,589,788 and the final drive, although it is of course possible to employ the arrangement of the present invention in respect of each pair of engines, one variable speed gear then being provided for each pair of engines and arranged to drive each sun wheel of the third differential gear.

The invention is further illustrated by reference to the accompanying drawings in which Figure 1 is a diagrammatic side elevation of a railway locomotive driven by a power plant according to the present invention.

Figure 3 is a diagrammatic sectional plan view of the transmission gearing the locomotive of Figures 1 and 2.

Figure 4 is a plan view, similar to Figure 3 showing a modified transmission gearing.

Figure 5 is a diagrammatic representation of one of the main engine governors.

Figure 1:
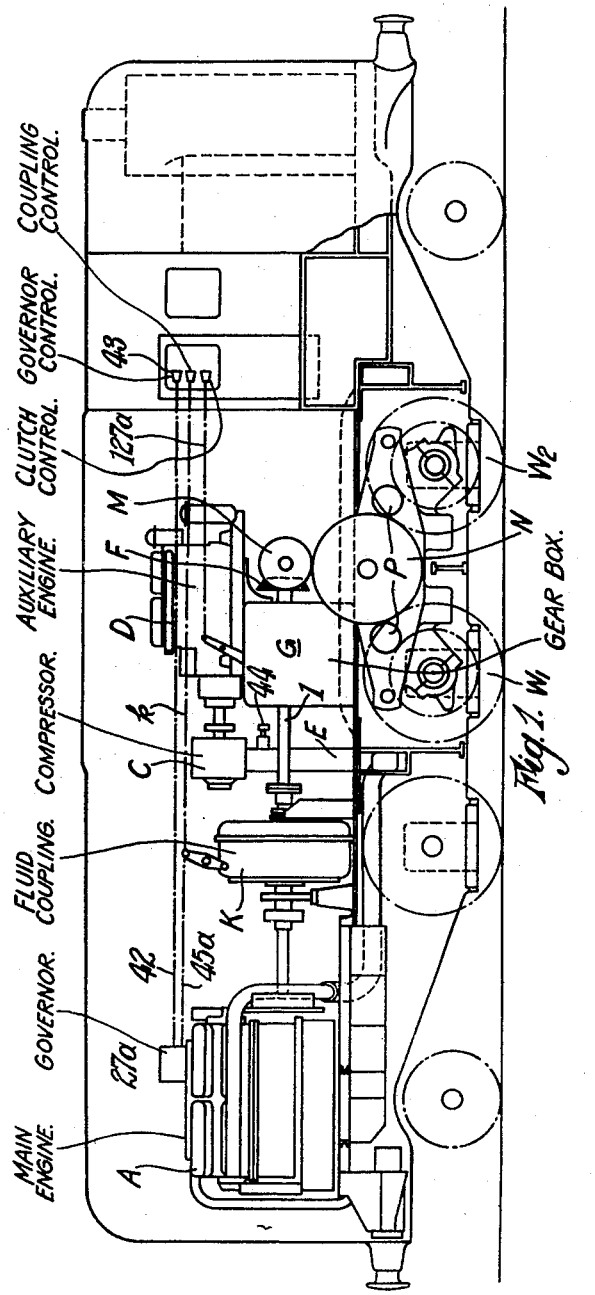
Figure 2:
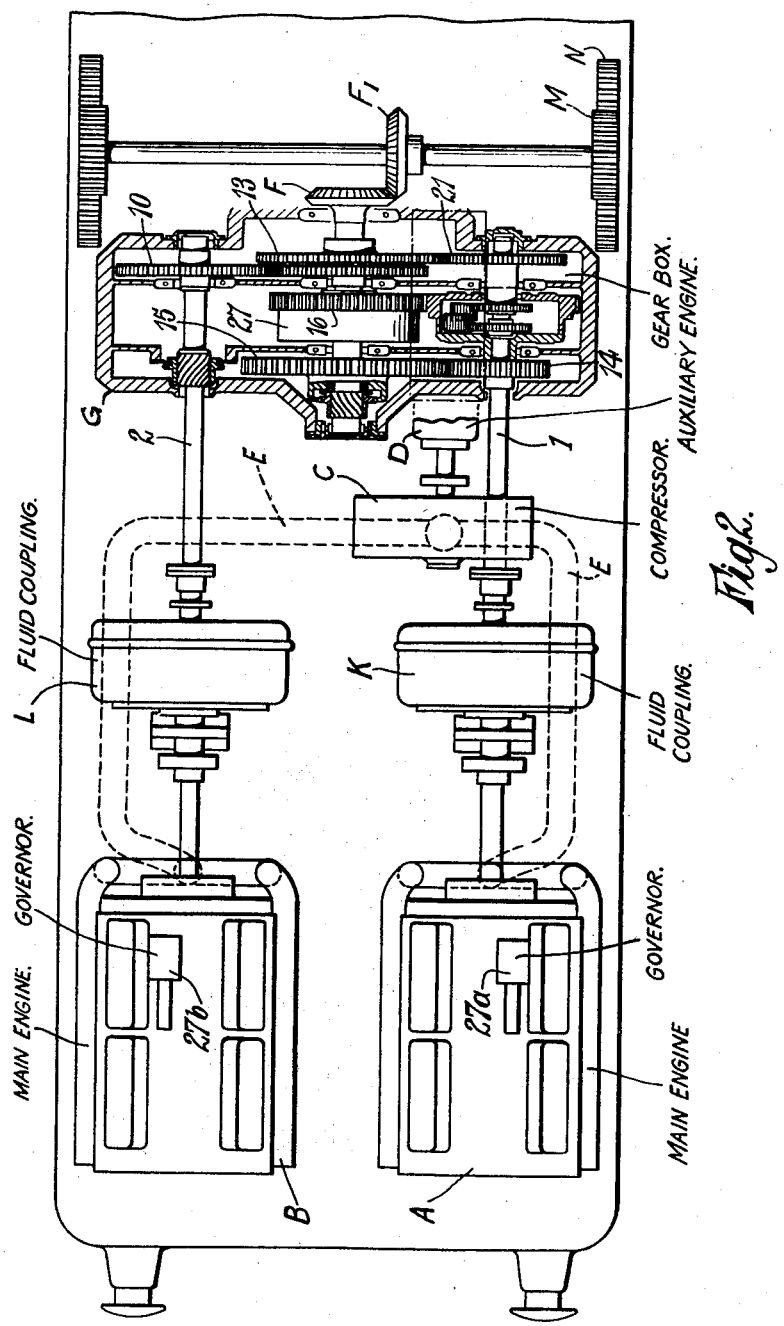
Figure 2 is a diagrammatic plan view, partly in section, showing the arangement of the main components of the locomotive of Figure 1.

Turning now to Figures 1 and 2, the locomotive shown therein is driven by a power unit comprising as prime movers two compression ignition main engines A and B which are situated side by side so that only engine A can be seen in Figure 1. Both engines A and B are supercharged by a blower C driven by an auxiliary compression ignition internal combustion engine D, the output of the blower C being supplied to the engines A and B by means of piping E. The main engines A and B drive the impellers of variable filling fluid couplings K and L respectively of known scoop controlled type. The scoops of the couplings K and L are separately controlled from the cab of the locomotive, the rod which controls the coupling K being shown diagrammatically as $k$. The rods are omitted from Figure 2 for the sake of clarity. The runners of couplings K and L drive shafts 1 and 2 respectively; these should extend into a gear box G, shown in more detail in Figure 3. Drive from the gear box G is taken from a bevel gear final drive F, $F_1$, which is a final drive in the sense that it normally receives the final or combined drive from both engines A and B. Locomotive track wheels $W_1$ and $W_2$ are driven from the bevel gear F by gears M, N, P.

Turning now to Figure 3, which shows the transmission gearing in the gear box G, a differential gear indicated generally by the reference 4 and having a casing or planet carrier 8 is mounted coaxially with the shaft 1; this shaft 1 has splined thereon a sun wheel or first input gear 5 of the differential gear. A sleeve 25, surrounding one end of the shaft 1, has secured thereto the other sun wheel or second input gear 9 of the differential gear. The gears 5 and 9 are connected by means of a number of pairs of planetary gears arranged symmetrically about the axis of the shaft 1, and mounted on spindles, not shown, carried by the casing 8. For the sake of clarity, only one of these pairs of planet gears 6, 7 is shown. Planet wheel 6 engages with the gear 5 and with the planet 7 and the planet 7 engages with the gear 9.

A gear wheel 10 secured to the shaft 2 drives the sleeve 25 through a gear train 11, 13, 21, gear 21 being secured to the sleeve 25.

The planet carrier 8 is provided with an extension sleeve 19 having splined thereon a gear wheel 14. A gear wheel 20 is also formed on the periphery of the planet carrier 8.

Gears 14 and 20 mesh with gears 15 and 16 respectively to form low and high speed gear trains respectively and these two last-mentioned gears are mounted on a shaft 3 carrying the final drive gear F. The gear wheel 15, when operative, is connected to the shaft 3 by means of a unidirectional device 26 of the type described in U. S. patent specification No. 2,610,526, and the gear wheel 16, when operative, is connected to the shaft 3 by means of a metal-to-metal friction clutch 27 of the type already known in marine and locomotive transmissions. Clutch 27 is controlled by control rod 127a (see Figure 1).

The gear ratio between the gears 16 and 20 is 1:1, between the gears 15 and 14, 2:1, and between the gears 13 and 21, 1.5:1. The gears 13 and 21 thus provide means whereby the planet carrier 8 is driven by the prime mover B at a different torque ratio from that at which the planet carrier 8 is driven by the prime mover A.

Shaft 2 is provided with a unidirectional device 18 to prevent reverse rotation thereof and hence of the input gear 9; this unidirectional device is of the type known as a "Legge synchro coupling" and comprises primarily a dog clutch member mounted on a helically splined part of the shaft 2 and operating by means of the combined action of the inertia of the dog clutch member and of the helical splines. A device of this type is described in more detail in U. S. patent specification No. 2,610,526.

The main engines A and B are provided with identical governors 27a and 27b respectively, only the first of which is shown in Figure 1. These governors 27a and 27b, one of which, governor 27a, is shown in Figure 5, are fully described in U. S. patent specification No. 2,600,983 and will not be described herein in further detail than is necessary for an understanding of the power plant now being described. The governor 27a comprises flyweights 30 which actuate a lever 31 by way of the linkage shown and a cam 32. The lower end of the lever 31 is pivotally connected to a rod 33 which is connected with the fuel control rack of the fuel injection pump 37 through an extensible link 34. Movement of the rod 33 in the direction of the arrow 35 has the effect of reducing the fuel injection to the engine, and the rod is urged in this direction by a spring 36. The lever 31 is provided at its centre with a cam roller 38 and is pivotally connected at its upper end at 39 to a rod 40. One end of the rod 40 abuts against a lever 41, which is pivotally connected at its upper end to a rod 45, and at its lower end abuts against a rod 42 the other end of which is actuated by a regulator lever 43 in the cab of the locomotive. The lever 43 is common to both the main engine governors 27a and 27b, that is to say it is arranged to actuate simultaneously the rods 42 of both governors.

The end of the rod 40 remote from the lever 41 is linked to the rod k which controls the scoop of the fluid coupling K driven by the main engine A, the arrangement being such that when the coupling is emptied, the rod 45 moves to the left from the position shown in Figure 5, sufficiently far to restrict the fuel injection of that main engine to the idling charge. When, however, the coupling is filled, the rod 45 moves to the position shown in Figure 5 at which it no longer restricts the fuel injection. It will be understood that while the interlock between the lever 41 and the coupling K is shown for simplicity as being mechanical, other means may be used for example the vacuum connection shown in the abovementioned U. S. Patent Specification No. 2,600,983. The governor 27a is provided with a solenoid 47 which is energised with the starting motor of the engine A so as to pull the lever 31 in a clockwise direction to increase the fuel injection to the value required for starting. Each of the governors 27a and 27b is further provided with a stopping lever 46 which, with the aid of the link 34, can be used to stop the engine regardless of the position of the lever 31.

The auxiliary engine D (Figure 1) is provided with a governor of known kind (not shown) which governs the engine to a constant speed. This speed is so selected that the blower C can deliver air to the main engines A and B at a maximum supercharging pressure until, but only until, the speed of these engines reaches a predetermined value. At main engine speeds higher than that value, the supercharging pressure falls steadily, while at speeds lower than that value the supercharging pressure is maintained constant by means of a blow-off valve 44. The profile of the cam 32 is such that, with the supercharging arrangements as stated, the torque of each main engine is at a maximum at the minimum operating speed of the engine, for example 200 R. P. M. and thereafter falls steadily as its speed increases. The governor thus serves to keep the torque of each main engine on a predetermined torque/speed curve. The function of the regulator lever 43 is to shift the fulcrum 39 of the lever 31 so as to control the zero setting of the governor 27a and hence the line of zero torque with respect to which the torque/speed curve is to be regarded as plotted. This control is contacted by the regulator lever 43 simultaneously for both the governors 27a and 27b of both the main engines A and B.

When it is desired to drive the locomotive, the clutch 27 is disengaged, so that the gear wheel 16 is free on the shaft 3, and the main engine A is started and the fluid coupling K filled by operation of rod k and regulator lever 43 so that the shaft 1 and therewith the input gear 5 rotate. Reverse rotation of the gear 9, due to the action of the load on the final drive F, is prevented by means of the unidirectional coupling 18, hence the gear 5 causes the gear casing 8 to turn in the same direction at half the speed and twice the torque of the main engine A.

The arrangement is such that the gear wheel 15 is turned in a direction which locks it to the shaft 3 by means of the unidirectional device 26 so that the movement of the planet carrier 8 is transmitted to the shaft 3 through a further 2:1 reduction gear constituted by the gear wheels 14 and 15. In this manner, the shaft 3 receives torque from the prime mover A with a four-fold torque multiplication.

The main engine B is now started and the fluid coupling filled by operation of the rod l and, when the torque of the prime movers A and B is balanced, which involves prime mover A rotating faster than the prime mover B in view of the gear ratio between the gear wheels 13 and 21 and the torque/speed characteristics of the prime movers, the gear 9 begins to rotate and the speed of the planet carrier 8 then increases to a speed slightly greater than that of either of the prime movers and drive to the shaft 3 then takes place at a speed which is slightly more than half the speed of the prime movers and a torque which is slightly less than twice the sum of the torques of both the prime movers.

When a suitable locomotive speed has been attained, the clutch 27 is engaged by movement of the control rod 127a to connect the gear wheel 16 with the shaft 3. The result of this operation is to slow down the differential casing 8 and to cause the disengagement of the unidirectional device 26. There is accordingly no discontinuity of the torque delivered to the shaft 3 when changing from low gear to high gear as the low gear is driving until it is over-ridden by the high gear. The speed of the shaft 3 is now doubled and the torque appiled to it is halved as compared with speed and torque achieved when driving through the gear 15.

Changing down simply involves disengaging the clutch 27 and drive will then be transmitted to the shaft 3 as soon as its speed falls below that of the gear wheel 15.

Turning now to Figure 4, where corresponding components have the same reference numerals as in Figure 1, the unidirectional device 26 and the clutch 27 are here replaced by a double dog clutch of which a dog clutch member 17 is splined on the shaft 3 and may be displaced in one direction to engage with the gear wheel 15 and in another direction to engage with the gear wheel 16. Thus, in a manner well known in spur gear constructions, one or other of the gear wheels 15 and 16 may be connected to the shaft 3 while the other remains free.

When the locomotive is drawing its maximum design load, the dog clutch member is set to connect the gear wheel 15 to the shaft 3, and a torque up to slightly less than twice the sum of the torques of both prime movers may be attained as indicated above by causing first the main engine A to drive the gear 5 and then the main engine B to drive the gear 9. When such a locomotive is running without a load or only lightly loaded, it is possible to have the dog clutch member 17 engaged with the gear wheel 16. When so disposed, the driving procedure is the same as that when driving through the gear 15 except that at each stage the speed of the shaft 3 is twice that of its speed at the corresponding stage when it is driven through the gear wheel 15.

In both the arrangements described above, it will be appreciated that the unidirectional clutch 18 may be disposed to act directly upon any element of the gearing connecting the shaft 2 with the gear wheel 9 and need not necessarily be mounted on the shaft 2 as shown.

The transmission gearing shown in Figures 3 and 4 may be modified by using any form of constant mesh variable speed gearing to drive the shaft 3 from the planet carrier 8 instead of the particular 2-speed gear described. Epicyclic gearing is an example of such alternative gearing.

Further variable speed gears, preferably 2-speed gears, may also be provided between the shaft 3 and the mechanism to be driven by the power plant to provide further torque multiplication if desired.

The association of the unidirectional brake 18 with the gear 9 as described above requires that the main engine A must always be used for starting and also renders it preferable to provide some simple manually operated device to lock the input gear 5, in the event of the failure of main engine A, to prevent the reverse rotation of this input gear by the main engine B. Such an arrangement, which avoids the cost of one unidirectional device, is preferable in connection with low-powered locomotives such as shunting locomotives which have only two engines. It is, of course, within the scope of the present invention to associate a unidirectional brake with the input gear 5 so that starting may be effected with either main engine A or B.

As an alternative to the arrangements described above, a locomotive may be provided with two power units according to the present invention, for example as shown in Figure 3, and each unit arranged to drive only a particular group of track wheels, for example one bogie; such a locomotive might have two power units and two bogies, each of which is driven only by one power unit.

I claim:

1. In a power unit, a plurality of prime movers, a pair of input shafts independently driven by said prime movers, an output shaft, and means for transmitting power from the input shafts to the output shafts, said means including an epicyclic gearing having at least three elements for combining the power from the input shafts, the first said element being connected to one input shaft, the second said element being connected to the other input shaft, and the third said element being journaled on one input shaft in driven relation with said first and second elements and in driving relation with said output shaft through at least two paths of power of different gear ratios and including means selectively coupling said paths of power to said output shaft.

2. In a power unit, a plurality of prime movers, a pair of input shafts independently driven by said prime movers, an output shaft, and means for transmitting power from the input shafts to the output shaft, said means including an epicyclic gearing having two sun gears, a planet carrier, and planet gearing mounted on said carrier and connecting the sun gears, said sun gears and planet carrier all being mounted on one input shaft, one sun gear being connected to one input shaft, the other sun gear being connected to the other input shaft, said planet carrier having a pair of external gears thereon, a pair of driven gears mounted on said output shaft and drivingly connected with said external gears, and means selectively connecting said driven gears to the output shaft.

3. In a power unit, a gear casing, a pair of independently driven input shafts journaled in said casing in spaced parallel relation, an output shaft journaled in said casing intermediate and parallel to said input shafts, a planet carrier journaled on one input shaft and having first and second driving gears thereon, first and second driven gears journaled on the output shaft and in mesh with the respective first and second driving gears, clutch means selectively connecting the driven gears to the output shaft, planet gearing mounted on said carrier, a first sun gear feathered to said one input shaft in mesh with said planet gearing, a second sun gear journaled on said one input shaft in mesh with said planet gearing, and means interconnecting said second sun gear with the other input shaft.

4. In the power unit defined in claim 3 wherein the last means includes gear mechanism journaled on said output shaft.

5. In the power unit as defined in claim 3 wherein said planet carrier encloses both said sun gears and said planet gearing.

6. In the power unit as defined in claim 5 wherein clutch means is connected to one input shaft for preventing rotation thereof in one direction.

7. In the power unit as defined in claim 3 wherein clutch means is connected to one input shaft for preventing rotation thereof in one direction.

8. In a power unit, a plurality of prime movers, a pair of input shafts independently driven by said prime movers, an output shaft, and means for transmitting power from the input shafts to the output shaft, said means including an epicyclic gearing having at least three elements, the first said element being fixed upon one input shaft, the second said element being journaled on said one input shaft and driven from the other input shaft, and the third said element being journaled on said one input shaft in driven relation with said first and second elements and in driving relation with said output shaft through at least two separate gear connections of different gear ratios and means selectively and operably connecting said gear connections with the output shaft.

9. In the power unit as defined in claim 8 wherein a one-way clutch couples one of said gear connections to the output shaft, and a friction clutch coupling the other gear connection to the output shaft.

10. In the power unit as defined in claim 8 wherein a dog clutch is slidably splined to said output shaft, said dog clutch being selectively engageable with said gear connections.

References Cited in the file of this patent

UNITED STATES PATENTS

| | | |
|---|---|---|
| 1,784,593 | Hild | Dec. 9, 1930 |
| 1,786,408 | Peterson | Dec. 23, 1930 |
| 2,030,761 | Pedemonte | Feb. 11, 1936 |
| 2,187,835 | Martin | Jan. 23, 1940 |
| 2,366,646 | Orr | Jan. 2, 1945 |
| 2,602,898 | Inghram et al. | July 8, 1952 |